US008511350B2

(12) United States Patent
Turner

(10) Patent No.: US 8,511,350 B2
(45) Date of Patent: Aug. 20, 2013

(54) PISTON SETTING DEVICE AND METHOD

(75) Inventor: Hayden Turner, Leominster, MA (US)

(73) Assignee: Sulzer MixPac AG, Haag (CH)

( * ) Notice: Subject to any disclaimer, the term of this patent is extended or adjusted under 35 U.S.C. 154(b) by 797 days.

(21) Appl. No.: 12/655,037

(22) Filed: Dec. 22, 2009

(65) Prior Publication Data

US 2011/0146836 A1 Jun. 23, 2011

(51) Int. Cl.

*B65B 1/04* (2006.01)
*B65D 88/54* (2006.01)
*G01F 11/00* (2006.01)
*B67D 7/60* (2010.01)

(52) U.S. Cl.

USPC .............. 141/27; 222/326; 222/386; 222/387

(58) Field of Classification Search

USPC ................. 141/7, 8, 25–28, 60, 65; 222/135, 222/137, 152, 275, 276, 309, 319, 326, 327, 222/372, 383.1, 383.3, 384, 385, 386, 387, 222/389

See application file for complete search history.

(56) References Cited

U.S. PATENT DOCUMENTS

| | | | | |
|---|---|---|---|---|
| 5,100,241 | A * | 3/1992 | Chan | 366/139 |
| 5,601,107 | A * | 2/1997 | Moore et al. | 137/15.04 |
| 6,257,714 | B1 * | 7/2001 | Seccombe | 347/92 |
| 6,494,348 | B2 * | 12/2002 | Prestele | 222/326 |
| 6,598,766 | B1 * | 7/2003 | Brugner | 222/326 |

FOREIGN PATENT DOCUMENTS

| | | |
|---|---|---|
| DE | 295 06 800 | 8/1996 |
| DE | 298 00 594 | 3/1998 |
| DE | 200 10 417 | 10/2001 |

* cited by examiner

*Primary Examiner* — Timothy L Maust
*Assistant Examiner* — Brandon J Warner
(74) *Attorney, Agent, or Firm* — Francis C. Hano; Carella, Byrne, et al

(57) ABSTRACT

The system for filling a cartridge employs a piston setting device that has a plunger for moving the venting valve of the piston to an open position and a conduit for venting the air from the opened valve under the influence of a vacuum source connected to the conduit via an attachment device.

8 Claims, 8 Drawing Sheets

PISTON SETTING DEVICE AND METHOD

FIELD OF THE INVENTION

The invention is broadly concerned with dispensing cartridges for fluid filling masses, in particular with multicomponent cartridges which are used for dispensing two or more components contemporaneously. In a multicomponent cartridge, each of the components is stored into its own storage chamber prior to dispensing. The storage chamber for each one of the components is separate from the storage chamber for any of the other components, such that the components may not mix during the storage period. The innovation pertains in particular to a cartridge comprising a piston setting device and a piston setting device for a cartridge as well as a method for operating a piston setting device to set a piston in said cartridge.

BACKGROUND OF THE INVENTION

When filling a cartridge chamber of a cartridge with a filling mass, it is common practice to close the cartridge chamber by inserting a piston into the cartridge chamber containing the filling mass. That means a piston is set or inserted into the cartridge chamber. It is desirable not to trap air in the cartridge chamber during this setting operation due to the fact that air may be harmful for the component stored in the cartridge chamber and due to the fact that air as a compressible gas may cause the piston to tilt when moved for discharging the filling mass from the cartridge. Additionally, the presence of a compressible gas will cause a pressure variation inside the chamber during dispensing which creates undesirable variations in flow and may result in poor performance of discharged material.

According to DE 298 00 594 U, a micropore filter is inserted into a pocket formed in the piston. By means of this micropore filter, the air trapped between the filling mass and the piston can escape when the piston is inserted into the cartridge. Furthermore, this micropore filter is to prevent any emission of the filling mass. However, volatile components of the filling mass can penetrate the micropore filter, which may lead to leakage.

DE 295 06 800 U shows another ventilation device. Here, the ventilation is performed by means of a plurality of valve plugs mounted around a divided circle of the piston cover, and these plugs are lifted from valve cones when the piston is pressed into the cartridge, thus enabling the discharge of air. However, this ventilation device can only be manufactured with tight manufacturing tolerances. Another disadvantage can be seen in that parts of the filling mass can advance up to the valves, which are then contaminated, so that their sealing function is adversely affected.

A cartridge piston is also known from DE 200 10 417 U1. The piston has a first piston part which is provided with a sealing lip which is designed for contact with the cartridge wall. The first piston part has a circular cylindrical recess. Furthermore, the piston has a second piston part which has a circular cylindrical wall part which is latched to the first piston part at the base of the recess and thus forms a latch connection. The circular cylindrical wall part merges in arcuate form into a valve pin of a venting valve. This valve pin passes through a cylindrical bore arranged along the piston axis in the first piston part and has a valve cone which comes into contact with a valve lip of the first piston part. The latch connection is interrupted by a small air passage which forms a filter path between the circular cylindrical wall part and the first piston part. The filter path is made up of narrow passages at the inner wall of the circular cylindrical wall part.

If the cartridge piston is inserted into a cartridge, the valve pin is moved such that the venting valve is opened and the air enclosed between the filling mass and the cartridge piston escapes via the air passage and the filter path and is discharged via the venting valve. If the cartridge piston is pressed toward the filling mass, filling mass can move via the air passage up to the filter path, but is prevented by the labyrinth formed by the filter path from being discharged through the venting valve.

Additionally, many materials packaged in cartridges are very viscous and form irregular surfaces rendering current piston setting techniques ineffective. Such irregular surfaces are in general not flat, but may comprise a plurality of peaks and valleys of irregular shape.

It is the object of the invention to provide a cartridge piston with a piston setting device which allows for a faster setting of the piston, thus for higher discharge rate of air.

The system and the piston setting device according to the invention allows the extraction of unwanted air between the fluid mass and piston by creating a negative pressure differential between fluid mass and cartridge piston.

At the same time, the valve remains dry and free of dirt. Creeping, oil-like components of the filling masses should be prevented from leaking from the valve.

SUMMARY OF THE INVENTION

The invention relates to a system for filling cartridges, to a piston setting device for setting a piston within a cartridge filled with a filling mass and to a method of setting a piston in a cartridge.

The invention relates to a system comprising a piston setting device and a cartridge comprising a piston and a cartridge chamber which can be filled by a filling mass. The filling mass can be enclosed between a closed outlet opening and a piston. The piston comprises a first piston part which rests in a sealed manner against the cartridge wall and a second piston part, which forms a venting valve comprising a valve plug together with the first piston part. Said valve plug opens when a pressure is exerted on the side of the piston opposite to the filling mass by a piston setting device. When the valve plug opens, any air trapped between the filling mass and the piston can escape. The escaping air is sucked into a conduit arranged in the piston setting device leading to a vacuum source when the valve plug is opened. The piston setting device comprises a housing, a conduit arranged in said housing, said conduit having a first end and a second end, said first end comprising an attachment element connectable to a vacuum source and said second end comprising a plunger, said plunger being connectable to the valve plug of the piston for opening said valve plug when said piston setting device is attached to said piston. A vacuum tube can be attached to the attachment element.

The pressure differential between the cartridge chamber and the drive side of the piston is thereby increased. The drive side of the piston is the side of the piston opposite the filling mass, thus the side of the piston to which the piston setting device is attached to. As a consequence of the higher pressure differential, the air leaves the cartridge chamber more rapidly. Therefore the piston setting device can be operated at higher speed, which in turn allows for the displacement speed of the piston to be increased.

The piston setting device advantageously comprises a gasket for providing a sealing of said piston in said cartridge.

Thereby the conduit in the piston setting device is sealed from the environment in order to apply a vacuum to said conduit.

The plunger contacts the valve plug of the venting valve of the piston, when said piston setting device is pushed against said piston. According to a first embodiment of the invention, said plunger can be an integral part of said piston setting device.

According to a second embodiment of the invention said piston setting device contains an interior plunger which is movable relative to said housing of said piston setting device.

The cartridge is fillable with a filling mass, the filling mass being enclosed by the piston and the cartridge wall, wherein the piston comprises a first piston part resting in a sealed manner against the cartridge wall and a second piston part, whereby a valve plug is formed by the first and second piston parts, said valve plug being opened for the passage of air trapped between the filling mass and the piston by the piston setting device when a pressure is exerted on a rear side of the piston.

A filter section is provided in the air passage between the first and second piston parts according to an advantageous embodiment of the invention.

This filter section has advantageously at least one narrow channel which forms a penetration barrier for the filling mass and ensures that the valve plug remains dry and free of dirt.

Advantageously the valve plug and the filter section are arranged concentrically to each other.

An outer region of the second piston part engages with the first piston part by an engagement connection, the engagement connection is interrupted by an air channel, and the filter section connects to the engagement connection.

The piston setting device is attached in a fluid-tight manner to said piston, A seal element can be provided between the piston setting device and the piston.

The piston setting device for a cartridge comprises a housing, a conduit arranged in said housing, said conduit having a first end and a second end, said first end comprising a plunger, said plunger being connectable to a venting valve of the piston comprising a valve plug for displacing said valve plug to an open position for allowing air to flow through the conduit and the second end comprising an attachment element connectable to a vacuum source.

Advantageously a vacuum tube is connected to the attachment element.

According to a preferred embodiment, the first end of the conduit has an inlet opening arranged adjacent said plunger. Alternatively the first end of the conduit may comprise a plurality of inlet openings. A plurality of inlet openings is in particular advantageous to increase the flow rate of the air. The inlet openings are preferably arranged circumferentially around the plunger, so that the flow path of the air is substantially the same regardless of the location of the passage at the engagement connection of the first piston part with the second piston part.

The inlet openings merge into the conduit prior the second end of the conduit. Thereby the air coming from a plurality of inlet openings can be collected to be directed to the outlet opening which is connected to the vacuum source. According to an advantageous embodiment, the attachment element may be plugged into the conduit. Alternatively a thread can be provided in the conduit for receiving the attachment element. The attachment element can be screwed into the thread.

Advantageously the housing can have an outer diameter which is smaller than the diameter of the piston. Thereby the housing can be introduced into the cartridge chamber at any desired position.

At least one inlet opening is arranged on the first end of the conduit on a face of the piston setting device, wherein the face of the piston setting device is the surface facing the piston. The outlet opening on the second end of the conduit is arranged in the wall of the piston setting device.

According to a second embodiment, the piston setting device for a cartridge comprises a housing, a conduit arranged in said housing, said conduit having a first end and a second end, said first end comprising a plunger, said plunger being connectable to a venting valve of the piston comprising a valve plug for displacing said valve plug to an open position for allowing air to flow through the conduit and the second end comprising an attachment element connectable to a vacuum source wherein said housing contains an interior plunger for closing the valve plug upon completion of the extraction of air. The interior plunger preferably has a longitudinal axis which is essentially coincident with the axis of the venting valve for closing the valve plug upon completion of the extraction of air.

The interior plunger is according to FIG. 3*b* and FIG. 3*c* movable with respect to the housing according to a particularly preferred variant of the second embodiment.

Furthermore the invention relates to a method for setting a piston in a cartridge comprising the step of attaching a piston setting device to a piston in a fluid tight manner, opening a valve plug in the piston by actuating the valve plug thereby opening a passageway for air from the cartridge chamber to a conduit in the piston setting device by contacting a plunger arranged on the face of the piston setting device with the valve plug and pushing the valve plug in an open position by the plunger, connecting an attachment element arranged on the piston setting device to a vacuum source.

A method for setting a piston in a cartridge according to a further embodiment of the invention comprises the step of attaching a piston setting device to a piston in a fluid tight manner, opening a valve plug in the piston by actuating the valve plug, thereby opening a passageway for air from the cartridge chamber to a conduit in the piston setting device wherein the valve plug is actuated by an interior plunger during the setting process for allowing a vacuum source to extract air between a filling mass disposed in said cartridge chamber and said piston and the interior plunger closes the valve plug after the extraction of air has been completed.

BRIEF DESCRIPTION OF THE DRAWINGS

The preferred embodiments are described in more detail in the following with reference to the drawings. Shown are in.

DETAILED DESCRIPTION OF THE INVENTION

Figure 1:
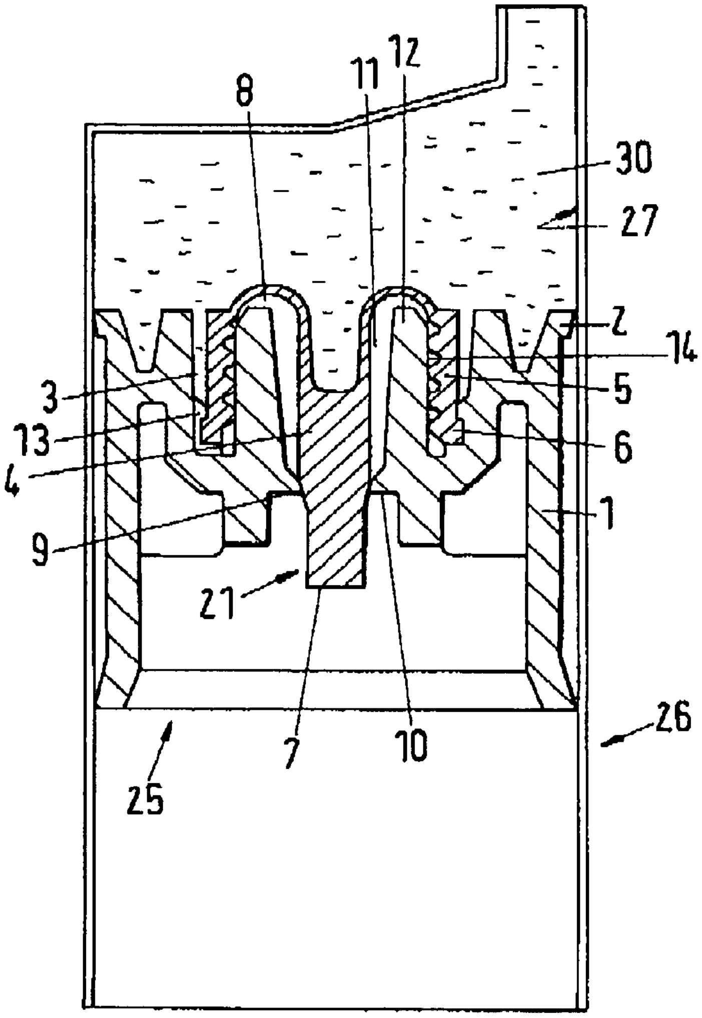
Fig.1 PRIOR ART
FIG. 1: a section through a first embodiment of a piston according to the prior art.

A cartridge 26 comprises a piston 25 which is moveable within a cartridge chamber 27 containing a filling mass 30. The piston 25 from FIG. 1 has a first piston part 1 with a sealing lip 2 that contacts the cartridge wall. This piston part 1 has a circular cylindrical recess 3. The piston further has a second piston part 4. This second piston part 4 forms a venting valve 21. The second piston part 4 features a valve face 9 that tapers towards the rear side of the piston and is pressed by the second piston part 4 against a valve lip 10 on the first piston part 1 when the second piston part 4 is engaged. The rear side of the piston 25 is the side of the piston opposite to the filling mass 30, that means the side of the piston that can be exposed to a piston setting device.

This second piston part 4 includes a circular cylindrical wall part 5 that engages with the first piston part 1 at the base of the recess 3. The engagement connection is designated with reference numeral 6. The circular cylindrical wall part 5 transitions along an arc into a valve plug 7. This valve plug 7 penetrates a cylindrical hole 11 in the first piston part 1 and has a valve face 9 that contacts the valve lip 10 of the first piston part 1. The arc-like transition region 8 crosses over the cylindrical wall 12 between the hole 11 and the recess 3.

The engagement connection 6 is interrupted by a small air channel 13. A filter section 14 is formed between the outer side of the wall 12 and the inner side of the circular cylindrical wall part 5. This filter section 14 comprises narrow channels in the inner wall of the wall part 5. The filter section 14 can be formed by circular channels, which have interruptions for passage of air between channels. They can also be formed by longitudinal ribs. Preferably, the filter section 14 is formed by threads, in particular helical threads. The channels of the filter section have a thickness of less than a millimeter, preferably less than 0.5 mm, particularly preferred less than 0.1 mm, so that viscous filling masses cannot penetrate through these channels.

The arc-like transition region 8 ensures that the valve plug 7 is pressed against the rear side of the piston. If the piston is inserted into a cartridge chamber by a piston setting device, then the valve plug 7 is moved upwards, whereby the valve formed by the valve face 9 and the valve lip 10 is opened. The air trapped between the filling mass and the piston escapes through the recess 3, the channel 13, and the filter section 14, and is emitted by the valve. If the piston is pushed against the filling mass, then this mass reaches completely throughout the channel 13, but not into the filter section 14. In this way, the filling mass is prevented from reaching the valve. For filling masses that secrete creeping, oil-like components, it is completely possible for these components to penetrate the filter section 14, but their emission is prevented by the venting valve 21.

The first piston part 1 can be at least partially covered by a cover plate having holes on the side facing the filling mass, which is not shown in the FIGS.

Figure 2:
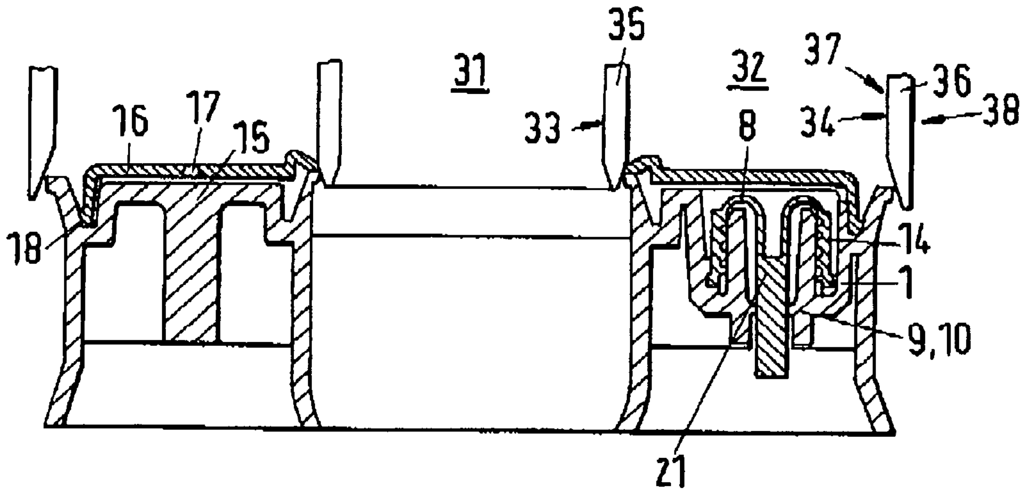
Fig. 2 PRIOR ART
FIG. 2: a section through an annular piston with the ventilation device from FIG. 1 according to the prior art.

According to FIG. 2, the second piston part 4 forming a filter and a venting valve 21 as shown in FIG. 1 is integrated into an annular piston 15. This annular piston 15 is covered by a cover plate 16 that is made out of a plastic material that is not attacked by the filling masses. That means that the plastic material is chemically resistant with respect to the filling mass. This cover plate has at least one ventilation hole 17 and/or one ventilation channel 18, by means of which the air trapped between the piston and the filling mass can escape to the filter and the valve. FIG. 2 shows a view of a piston for a coaxial cartridge. This coaxial cartridge is used for the storage and for the dispensing of a first component 31 and of at least one second component 32. The two components 31,32 are separate from one another during the period of the storage. If the two components are required in an application, they are dispensed from the coaxial cartridge 38 simultaneously and are conveyed in this manner to the provided application location. Sealing compositions, adhesive compositions or mold compositions for the manufacture of dental impressions or other filling masses for dental prostheses are named as examples as representatives for a large number of further application possibilities.

The coaxial cartridge 38 has an inner storage chamber 33 which serves for the reception of the first component 31 and an outer chamber 34 which surrounds the inner storage chamber 33 and which serves for the reception of the second component 32. The inner storage chamber 33 and the outer storage chamber 34 are divided from one another by a jacket element 35. The jacket element 35 can in particular be made as an inner tube having a circular cross-section. The outer storage chamber 34 is in turn surrounded by an outer jacket element 36 which can in particular be made as an outer tube with a circular cross-section. The jacket element 35 is received concentrically in the outer jacket element 36. The inner surface of the outer jacket element 36 will be called a cartridge wall 37 in the following.

The first and second flowable components 31, 32 can thus be dispensed from the corresponding inner and outer storage chambers 33, 34 simultaneously by movement of an inner piston 25 and of an annular piston 15.

The coaxial cartridge has an inlet end and outlet end, which is not shown in the FIGS. The first component 31 and the second component 32 exit through the outlet end when they are dispensed from the inner and outer storage chambers 33, 34. Outlet passages, which are closable by a closure element, are provided for this purpose at the outlet end.

A coaxial cartridge is usually filled via the inlet end. For this purpose, the outlet passages are held closed by the closure element, at least toward the end of the filling procedure, to keep the components 31, 32 completely separate from one another. Any air captured between the components 31, 32 and the outlet passages can escape by occasional release of the outlet passages or by the respective valve according to FIG. 1,2 or 7.

Once the filling of the inner storage chamber 33 with the first component 31 and of the outer storage chamber 34 with the second component 32 is completed, the inner storage chamber 33 is closed by the inner piston 25 and the outer storage chamber is closed by the annular piston 15. In this state, the two components 31, 32 are enclosed in the coaxial cartridge such that they are transportable and can be stored at least for a limited period.

Figure 3A:
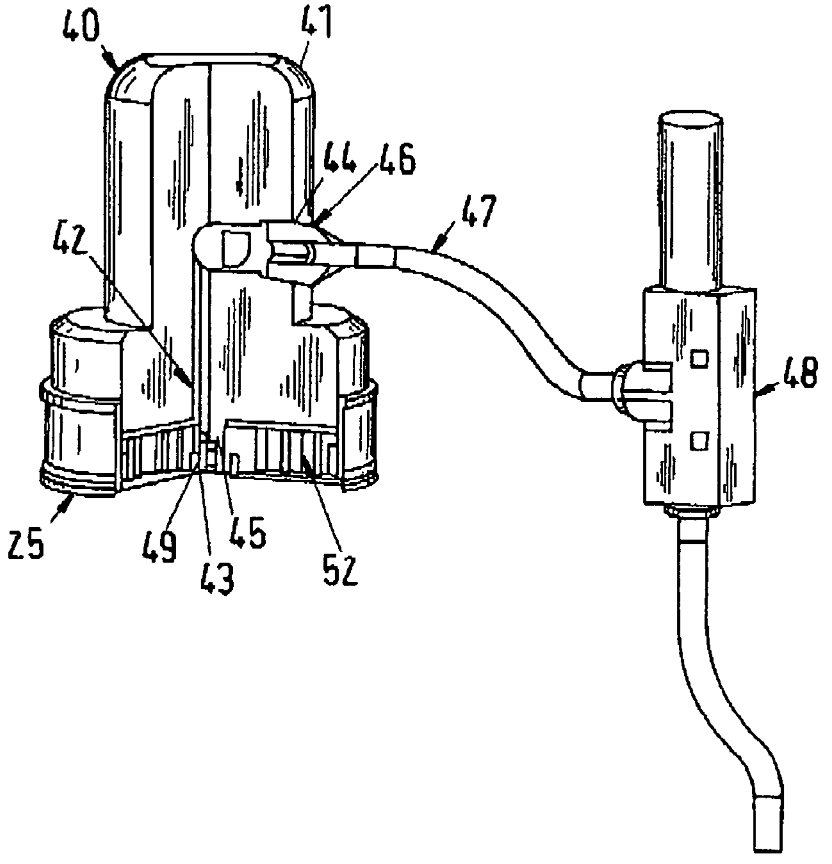
FIG. 3*a*: a piston according to FIG. 1 and a piston setting device according to the invention attached to said piston.

FIG. 3*a* shows a piston 25 according to FIG. 1 and a piston setting device 40 attached to said piston 25 according to a first embodiment of the invention.

Figure 4:
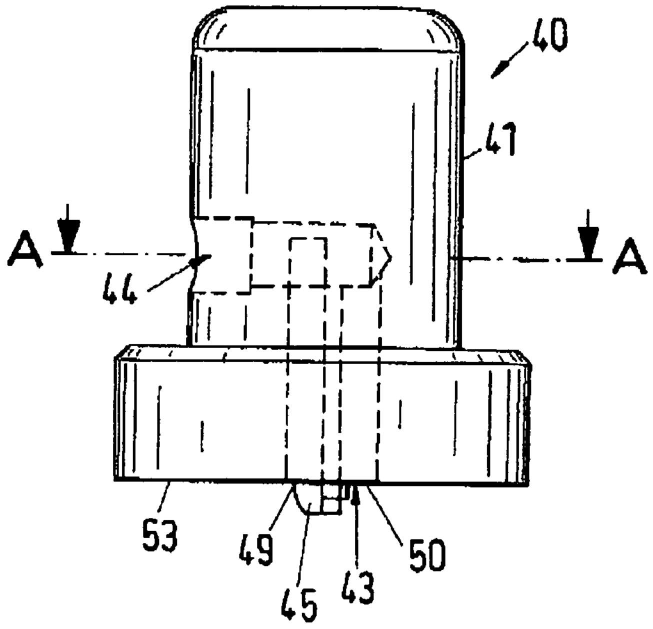
FIG. 4: a front view of the piston setting device according to FIG. 3*a*.

The piston setting device 40 for a cartridge comprises a housing 41, a conduit 42 arranged in said housing, said conduit 42 having a first end 43 and a second end 44, said first end 43 comprising a plunger 45, said plunger 45 being connectable to a valve plug 7 of a venting valve 21 of the piston for displacing said valve plug 7 to an open position for allowing air to flow through the conduit 42 and the second end 44 comprising an attachment element 46 connectable to a vacuum source 48. The attachment element 46 can be plugged into the conduit 42. This allows for an easy assembly and disassembly of the attachment element 46. The attachment element 46 can be a conventional hose adapter. Alternatively a thread can be provided in the conduit 42 at the second end 44 thereof for receiving the attachment element 46. Such a thread is shown in FIG. 4 and the thread is extending at some distance into the bore receiving the conduits from the plurality of inlet openings 49, 50, 51.

Advantageously a vacuum tube 47 is connected to the attachment element. Such a vacuum tube can be a flexible hose allowing for a displacement of the piston setting device 40 together with the piston.

Figure 5:
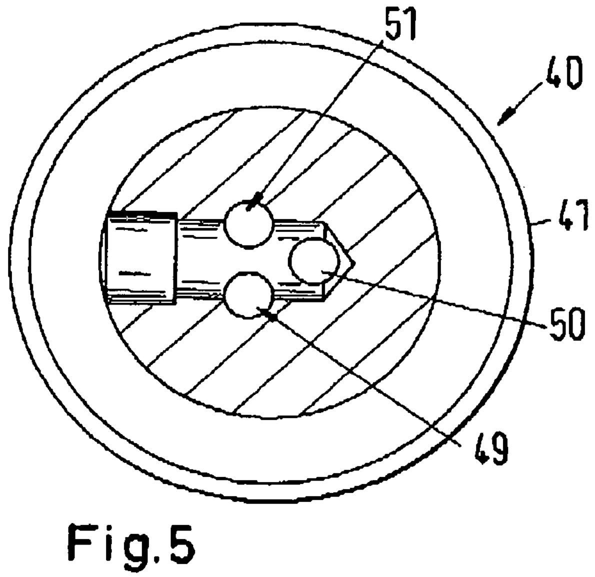
FIG. 5: a section through the piston setting device according to FIG. 4.

The first end 43 of the conduit 42 has at least one inlet opening 49, 50, 51 arranged adjacent said plunger 45. Preferably, the first end 43 of the conduit 42 comprises a plurality of inlet openings 49, 50, 51, which is best seen in FIG. 5. Advantageously the housing 41 has an outer diameter which is smaller than the diameter of the piston 25. The piston setting device 40 can thus be inserted into the cartridge chamber, which allows for improving the ventilation at any position of the piston 25 in the cartridge chamber.

Between the piston and the face 53 of the piston setting device 40, a sealing element 52 can be provided.

Figure 3C:
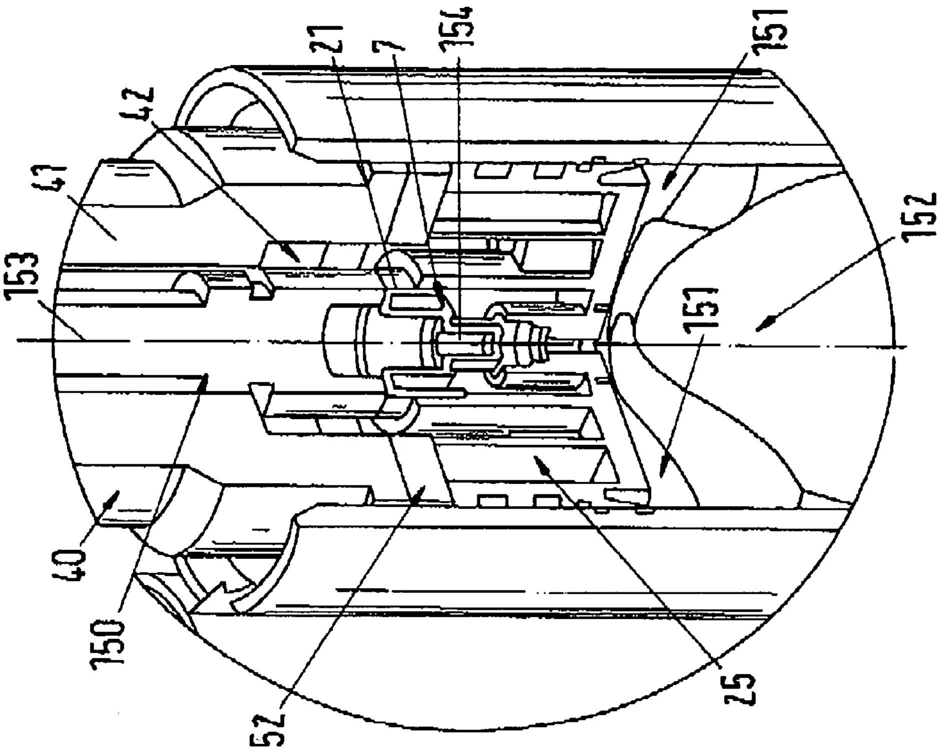
FIG. 3*c*: a detail of FIG. 3*b* marked with the letter A in FIG. 3*b*.
Figure 3B:
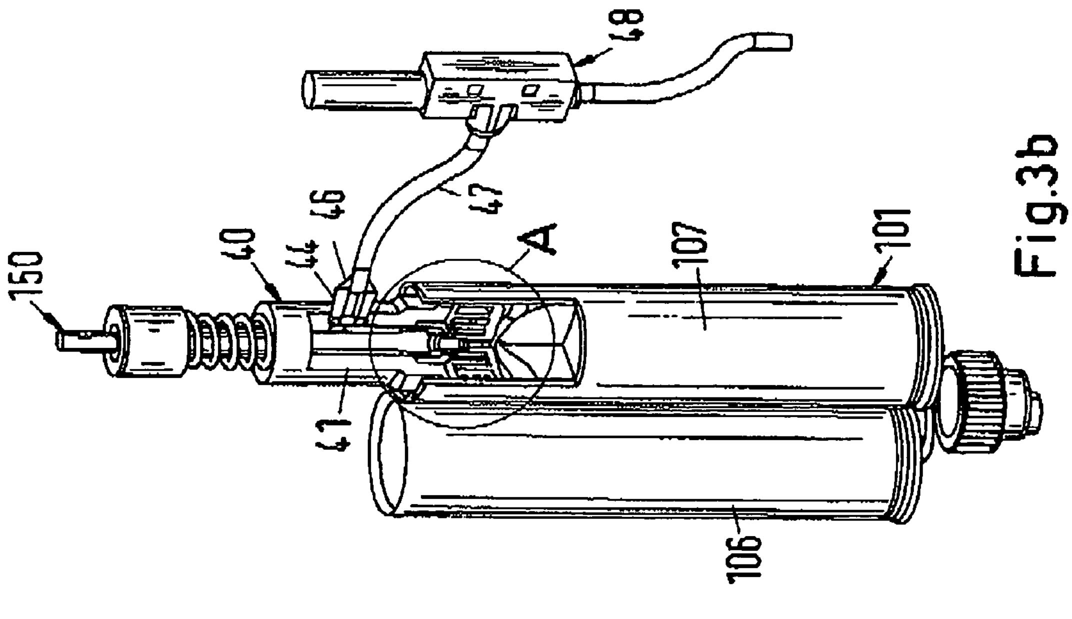
FIG. 3*b*: a variant of a piston and a piston setting device according to a second embodiment of the invention.

FIG. 3*b* shows a piston 25 according to FIG. 1 and a piston setting device 40 attached to said piston 25 according to a second embodiment of the invention. Parts which have the same function as in FIG. 3*a* carry the same reference numerals and it is referred to the description of FIG. 3*a* for these parts. The piston setting device according to FIG. 3*b* comprises an interior plunger 150 which has a longitudinal axis 153. As shown in FIG. 3*c*, the piston has a venting valve 21 which is arranged in the central area of the piston, that means the axis of symmetry 154 of the venting valve 21 corresponds to the axis of symmetry 153 of the piston. However the location of the interior plunger 150 essentially depends on the location of the venting valve 21 on the piston. Preferably the axis of symmetry 154 of the venting valve 21 essentially corresponds to the longitudinal axis 153 of the interior plunger 150.

The interior plunger 150 is according to the embodiment of FIG. 3*b* movable with respect to the housing 41 of the piston setting device 40.

Figure 8:
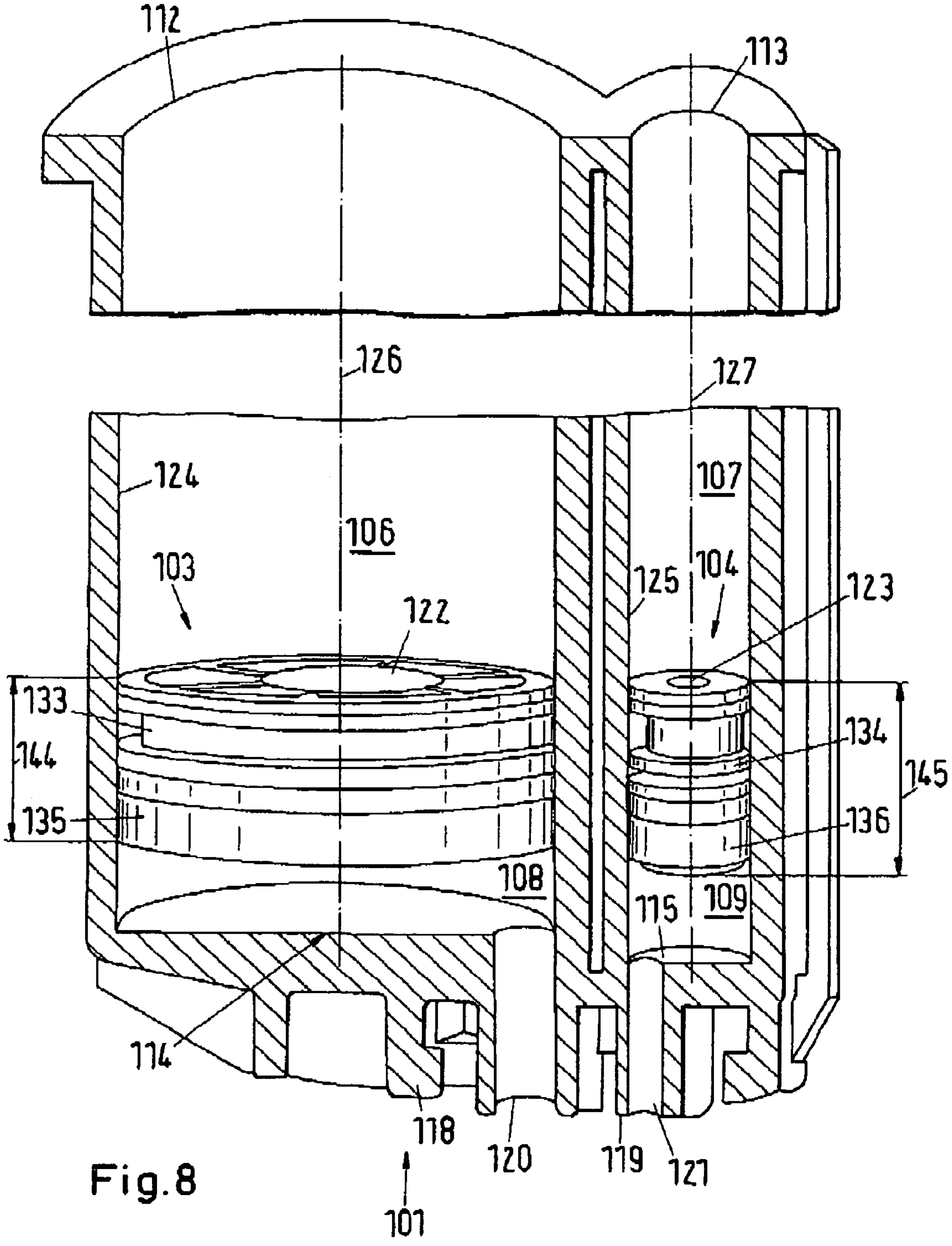
FIG. 8: a perspective sectional view of a two component cartridge.

It is thus possible to open the passageway to the conduit 42 at any position of the piston setting device 40. The piston setting device 40 can thus operate as a plunger to displace the piston 15, 25 to discharge the filling mass 152 from the respective cartridge chamber 106, 107 as best seen in FIG. 8.

FIG. 4 is a front view of the piston setting device according to FIG. 3. At least one inlet opening 49, 50 is arranged on the first end 43 of the conduit 42 on a face 53 of the piston setting device facing the piston and the outlet opening on the second end 44 of the conduit is arranged in the wall of the piston setting device 40. The inlet openings 49, 50, 51 merge into the conduit 42 prior the second end 44 of the conduit 42. The inlet openings 49, 50, 51 are arranged circumferentially around the plunger 45.

FIG. 5 shows a section through the piston setting device according to FIG. 4 Three inlet openings 49, 50, 51 are connected to the conduit 42 leading to the second end 44. The second end 44 is provided with a thread for releasably attaching an attachment element.

Figure 6:
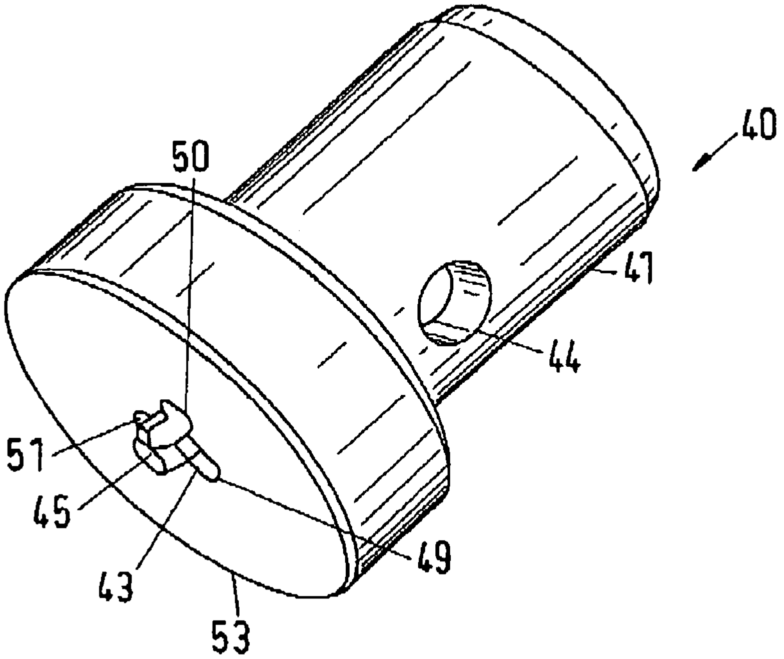
FIG. 6: a perspective view of the piston setting device according to FIG. 3*a*.

FIG. 6 a perspective view of the piston setting device 40. The piston setting device according to FIG. 6 is the same as described in connection with FIG. 3 to FIG. 5.

Figure 7:
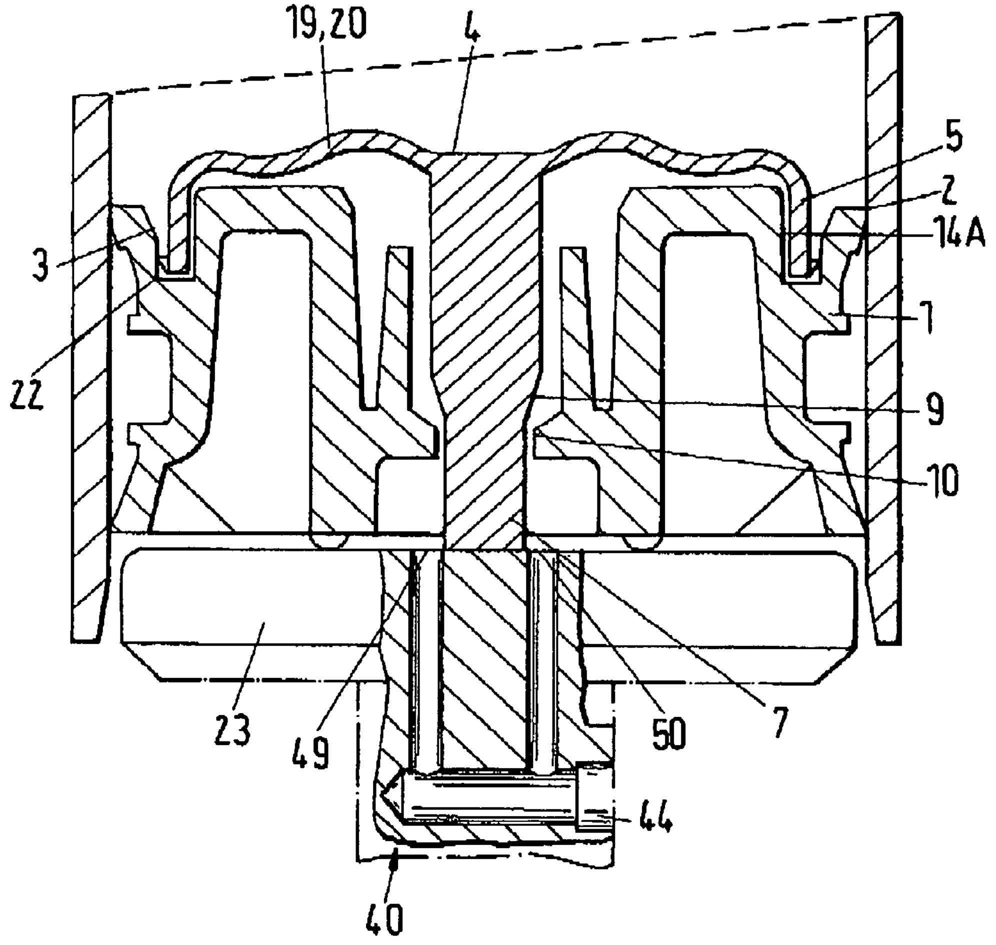
FIG. 7: a section through an alternative embodiment of a piston and a piston setting device according to a further embodiment of the invention.

The piston of FIG. 7 is distinguished from that in FIG. 1 primarily due to the fact that instead of the arc-like transition region 8, there is provided a disk-like transition region 19. The transition region 19 comprises at least one concentric undulation 20. This disk-like transition region 19 exhibits a spring function that ensures that the valve face 9 is pressed against the valve lip 10. While the filter section 14 is formed by a helical channel in the embodiment from FIG. 1, the filter section 14A from FIG. 7 is formed by axial grooves 22 that are formed in the second piston part 4. Instead of axial grooves, there can also be helical grooves.

FIG. 7 illustrates how a piston setting device 40 23 acts against the valve plug 7 and thus opens the valve by lifting the valve face 9 from the valve lip 10.

The piston setting device 40 may belong to a commercial expulsion gun which is not shown in the FIGS. Such a piston setting device is shown in part in FIG. 7. The piston setting device in its simplest embodiment includes a circular plate 23 which is designed to be placed on the piston 25 or an annular piston 15 according to FIG. 2. The only difference to the piston setting device 40 is that the plunger 45 is located eccentrically with respect to the longitudinal axis of the piston due to the fact that the valve plug 7 is also located eccentrically with respect to the longitudinal axis of the piston.

FIG. 8 is a perspective sectional view of a two component cartridge 101. The two component cartridge 101 comprises a first cartridge chamber 106 for a first component 108 and a second cartridge chamber 107 for a second component 109. The first cartridge chamber is separated from the second cartridge chamber 107 so to avoid any contact between the two components. Such components usually interact with each other when coming into contact, whereby a chemical reaction can be initiated. Such an interaction by the components is a desired effect for the application in which they are to be used, however it is disadvantageous as long as the components are to be stored e.g. in a warehouse. The two-component cartridges have sometimes to be stored also when partially emptied. For the complete duration of the storage period it has to be ensured that the components do not come into contact with each other.

The two-component cartridge has a first filling end 112 and a second filling end 113. A first piston 103 and a second piston 104 can be inserted into the corresponding first and second cartridge chamber 106, 107. The first piston 103 is moveable within the first cartridge chamber 106, the second piston 104 is moveable within the second cartridge chamber 107. Each of the first and second pistons 103, 104 is provided with a sealing element 135, 136 to provide a fluid-tight seal for the filling mass in the cartridge chambers.

The first and second cartridge chambers 106, 107 have different cross-sectional areas due to the fact that the mixing ratio of the first and second components 108, 109 is not necessarily 1:1.

The first piston 103 slides along a first cartridge wall 124 of the first cartridge chamber 106 in direction of the first discharge end 114 if the filling mass present in the first cartridge chamber 106, this being the first component 108 is to be discharged from the first cartridge chamber 106. The second piston 104 slides along a second cartridge wall 125 of the second cartridge chamber 107 in direction of the second discharge end 115 if the filling mass present in the second cartridge chamber 107, this being the second component 109, is to be discharged from the second cartridge chamber 107. The components 108, 109 are shown as transparent filling mass so as to make the structure of the cartridge visible.

The first and second pistons 103, 104 are each movable by a plunger element which is not shown in FIG. 8. A piston setting device according to FIGS. 3 to 7 can be attached to the plunger element. Alternatively the piston setting device can be formed integrally with the plunger element. Preferably the first and second pistons 103, 104 are moved contemporaneously as to ensure that the discharge of the first and second components 108, 109 occurs simultaneously and contemporaneously.

The first cartridge chamber 106 and the second cartridge chamber 107 are connected at their first and second discharge ends 114, 115, thereby defining the spatial position of the first cartridge chamber 106 with respect to the second cartridge chamber 107. The first and second discharge ends 114, 115 lead into a corresponding first and second discharge element 118, 119 which contains the corresponding first discharge opening 120 and second discharge opening 121. The first and second cartridge chambers 106 and 107 are located next to each other and the longitudinal axis 126 of the first cartridge chamber 106 is parallel to the longitudinal axis 127 of the second cartridge chamber 107.

In operation, the two component cartridge is filled from the first filling end 112 and the second filling end 113 with the corresponding first and second components 108, 109. The first and second discharge opening 120 and 121 are each closed at least after any air remaining enclosed between the respective filling mass and the discharge opening is vented. After completion of the filling of the first cartridge chamber 106 with the first component 108 and the second cartridge chamber 107 with the second component 109, the first piston 103 is inserted into the first cartridge chamber 106 and the second piston 104 is inserted into the second cartridge chamber 107. The first piston 103 comprises a first valve 122 and the second piston 104 comprises a second valve 123. Each of these first and second valves 122, 123 may be of a similar construction as shown in FIG. 1 or FIG. 7. When inserting the respective first and second pistons 103, 104 into the respective cartridge chambers 106, 107 a piston setting device according to any of FIGS. 3 to 6 is connected fluid tightly to said respective piston 103, 104 and the piston setting device is connected to a vacuum source. By applying a vacuum, the air trapped between the piston and the filling mass passes via the conduit 42 (see e.g. FIG. 3) and the piston can be inserted quickly as the air escapes directly through the conduit 42.

The first piston 103 comprises a first piston body 133 which has a first height dimension 144. The second piston 104 comprises a second piston body 134 which has a second height dimension 145. The passage of any air between the piston 103, 104 and the respective cartridge wall 124, 125 is prevented by respective first and second sealing elements 135, 136, which can comprise one or more elastically deformable protrusions.

When the first and second components 108, 109 are discharged from their respective cartridge chambers 106, 107 pressure is applied to the first and second pistons 103, 104 by a plunger element. The pistons 103, 104 are thereby advanced in the direction of the respective first and second discharge element 118, 119. The first and second components 108, 109 are moved into the first discharge opening 120 and the second discharge opening 121. Thereby two separate fluid streams of each of the components 108, 109 are produced which can be applied to the desired application or can be lead into a mixer attached to the first and second discharge elements 118, 119. The mixer can be in particular a static mixer.

What is claimed is:

1. A system for filling cartridges comprising:

a cartridge having at least one chamber for receiving a filling mass and a closeable outlet opening for the discharge of the filling mass;

a piston slidably mounted in sealed relation in said chamber of said cartridge for pushing of the filling mass from said chamber through said outlet opening;

a venting valve positioned in said piston for movement from a closed position to an open position to allow air within said chamber between the filling mass and said piston to vent through said piston in a direction away from said chamber; and a piston setting device including a housing for abutting against said piston in said cartridge, a plunger in said housing for moving said venting valve to said open position, a conduit extending through said housing and having at least one inlet adjacent said plunger, and an attachment element in communication with said conduit and connectable to a vacuum source for drawing a vacuum within said conduit whereby, in response to movement of said venting valve to said open position and a vacuum within said conduit, air within said chamber between the filling mass and said piston may be vented through said piston and said conduit.

2. A system according to claim 1 wherein said piston setting device further includes a gasket for sealing of said piston in said cartridge.

3. A system according to claim 1 wherein said plunger is integral with said housing.

4. A system according to claim 1 wherein said plunger is movably mounted within said housing.

5. A system according to claim 1 wherein said venting valve includes a valve plug for seating against an annular lip in a passage through said piston and said plunger of piston setting device contacts said valve plug when said piston setting device is pushed against said piston.

6. A system according to claim 5 wherein said piston has a filter section in said passage.

7. A system according to claim 6 wherein said filter section has at least one narrow channel forming a penetration barrier for the filling mass.

8. A system according to claim 5 wherein said valve plug and said filter section are arranged concentrically to each other.

* * * * *